United States Patent [19]
Halseth

[11] Patent Number: 5,417,310
[45] Date of Patent: May 23, 1995

[54] VEHICLE DRIP GUARD

[76] Inventor: Eldon L. Halseth, P.O. Box 14, Woodacre, Calif. 94973

[21] Appl. No.: 208,316

[22] Filed: Mar. 10, 1994

[51] Int. Cl.⁶ .................................................. F16N 31/00
[52] U.S. Cl. ...................................... 184/106; 141/86; 184/109
[58] Field of Search .................... 184/1.5, 106; 141/86, 141/87, 88, 98; 220/573

[56] References Cited
U.S. PATENT DOCUMENTS

| | | | |
|---|---|---|---|
| 3,316,995 | 5/1967 | Fay | 184/106 |
| 4,684,562 | 8/1987 | Hartkemeyer | 428/182 |
| 4,826,030 | 5/1989 | Valley | 220/573 |
| 4,936,418 | 6/1990 | Clausen | 184/106 |
| 5,020,638 | 6/1991 | Smith | 220/573 |
| 5,329,974 | 7/1994 | Paping | 184/1.5 |

Primary Examiner—Thomas E. Denion

[57] ABSTRACT

A vehicle drip guard for collecting fluids that leak from a vehicle comprising a sheet of material adapted to be extended under a vehicle; an absorbent mechanism disposed upon the sheet for collecting leaking fluids from a vehicle; and a coupling mechanism for coupling the sheet under and to a vehicle.

1 Claim, 4 Drawing Sheets

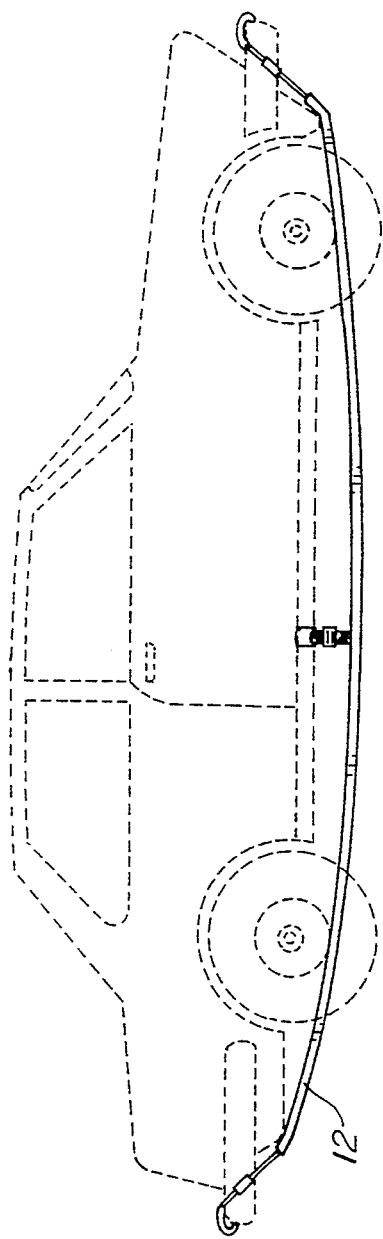
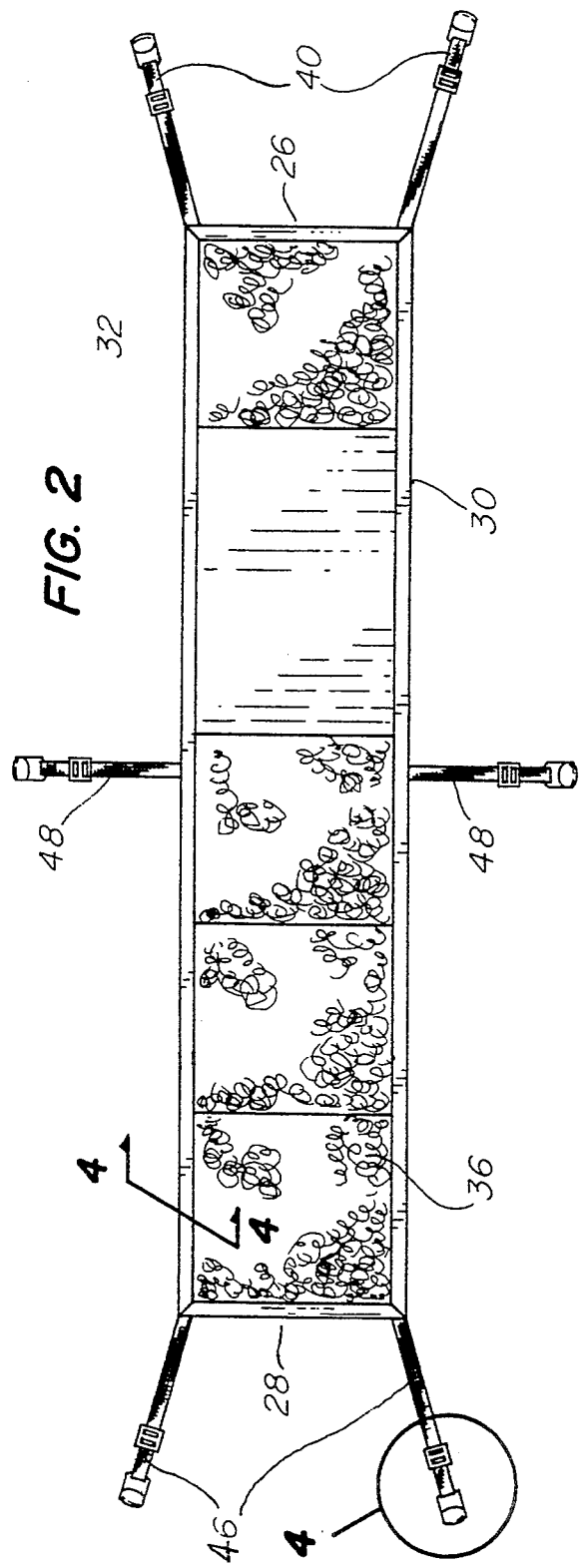

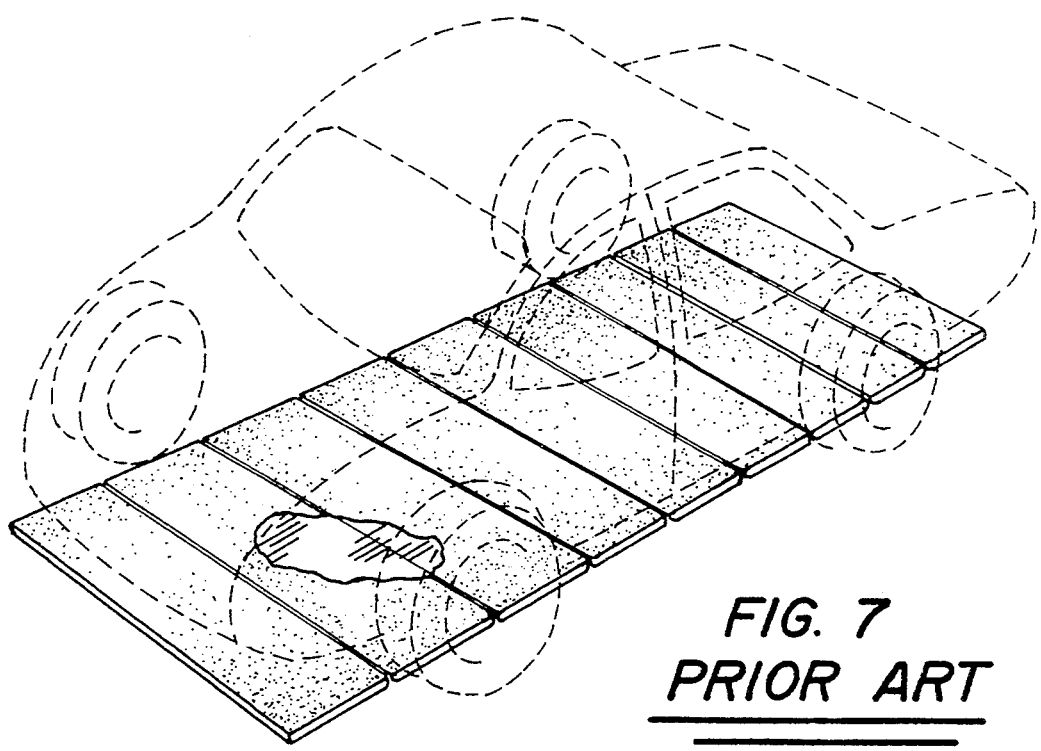
FIG. 7
PRIOR ART
FIG. 8
PRIOR ART
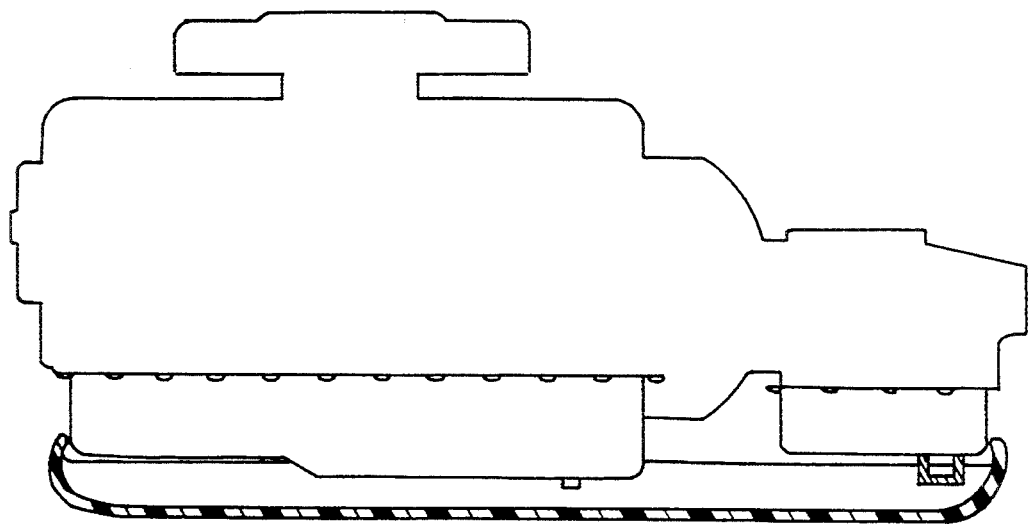

VEHICLE DRIP GUARD

BACKGROUND OF THE INVENTION

1. Field of the Invention

The present invention relates to a vehicle drip guard and more particularly pertains to collecting fluids that leak from a vehicle with a vehicle drip guard.

2. Description of the Prior Art

The use of vehicle drip guards is known in the prior art. More specifically, vehicle drip guards heretofore devised and utilized for the purpose of collecting leakage from under vehicles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,651,884, to Dorries discloses an oil drip guard. U.S. Pat. No. 3,722,626, to Stack discloses a car port oil drip mat. U.S. Pat. No. 4,801,005, to Hahn et al. discloses an oil dripping absorption and containment kit. U.S. Pat. No. 4,695,088, to Jensen discloses an oil drip collector. U.S. Pat. No. 4,875,537, to Garnatz et al. discloses a disposable oil absorbent drip pad assembly for a vehicle.

While these devices fulfill their respective, particular objective and requirements, the aforementioned patents do not describe a vehicle drip guard that is formed in a diaper-like configuration that remains attached under and to a vehicle even while it is in motion.

In this respect, the vehicle drip guard according to the present invention substantially departs from the conventional concepts and designs of the prior art, and in doing so provides an apparatus primarily developed for the purpose of collecting fluids that leak from vehicles.

Therefore, it can be appreciated that there exists a continuing need for new and improved vehicle drip guard which can be used for collecting fluids that leak from vehicles. In this regard, the present invention substantially fulfills this need.

SUMMARY OF THE INVENTION

In the view of the foregoing disadvantages inherent in the known types of vehicle drip guards now present in the prior art, the present invention provides an improved vehicle drip guard. As such, the general purpose of the present invention, which will be described subsequently in greater detail, is to provide a new and improved vehicle drip guard and method which has all the advantages of the prior art and none of the disadvantages.

To attain this, the present invention essentially comprises, in combination, a flexible and rectangular sheet of material adapted to be extended under a vehicle from the front end to the rear end and from one side to the other side, the sheet having an exterior surface, an interior surface, opposed front and rear edges, and opposed side edges with the edges curved upwards towards the interior surface to define a peripheral flap; a plurality of absorbent pads disposed upon the interior surface of the sheet and adjustably positioned under the peripheral flap for collecting leaking fluids from a vehicle; an absorbent cloth disposed between the pads and sheet for collecting excess fluids that leak through the pads; a pair of front securement straps, each strap having a first end coupled to the exterior surface of the sheet near each front corner thereof, a second end having securable means coupled thereto, and adjustable means coupled therebetween for adjusting the length of the strap such that the securable means on both straps are adapted to be secured to and hold the front edge of the sheet under and near the front end of a vehicle; a pair of rear securement straps, each strap having a first end coupled to the exterior surface of the sheet near each rear corner thereof, a second end having securable means coupled thereto, and adjustable means coupled therebetween for adjusting the length of the strap such that the securable means on both straps are adapted to be secured to and hold the rear edge of the sheet under and near the rear end of a vehicle; and a pair of side securement straps, each strap having a first end coupled to the exterior surface of the sheet on each side edge thereof, a second end having securable means coupled thereto, and adjustable means coupled therebetween for adjusting the length of the strap such that the securable means on both straps are adapted to be secured to and hold the side edges of the sheet under and near the side edges of a vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle drip guard which has all the advantages of the prior art guards and none of the disadvantages.

It is another object of the present invention to provide a new and improved vehicle drip guard which may be easily and efficiently manufactured and marketed.

It is a further object of the present invention to provide a new and improved vehicle drip guard which is of durable and reliable construction.

An even further object of the present invention is to provide a new and improved vehicle drip guard which is susceptible of a low cost of manufacture with regard to both materials and labor, and which accordingly is then susceptible of low prices of sale to the consuming public, thereby making such a vehicle drip guard economically available to the buying public.

Still yet another object of the present invention is to provide a new and improved vehicle drip guard which provides in the apparatuses and methods of the prior art some of the advantages thereof, while simultaneously overcoming some of the disadvantages normally associated therewith.

Even still another object of the present invention is to provide a new and improved vehicle drip guard for collecting fluids that leak from vehicles.

Lastly, it is an object of the present invention to provide a new and improved vehicle drip guard comprising a sheet of material adapted to be extended under a vehicle; absorbent means disposed upon the sheet for collecting leaking fluids from a vehicle; and coupling means for coupling the sheet under and to a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the preferred embodiment of the vehicle drip guard constructed in accordance with the principles of the present invention.

FIG. 2 is a plan view of the present invention with the pads positioned for collecting fluids from a vehicle.

FIG. 7 is a perspective illustration of a prior art device for catching drippings.

FIG. 8 is another prior art device for cathing drippings.

The same reference numerals refer to the same parts through the various Figures.

DESCRIPTION OF THE PREFERRED EMBODIMENT

Figure 3:
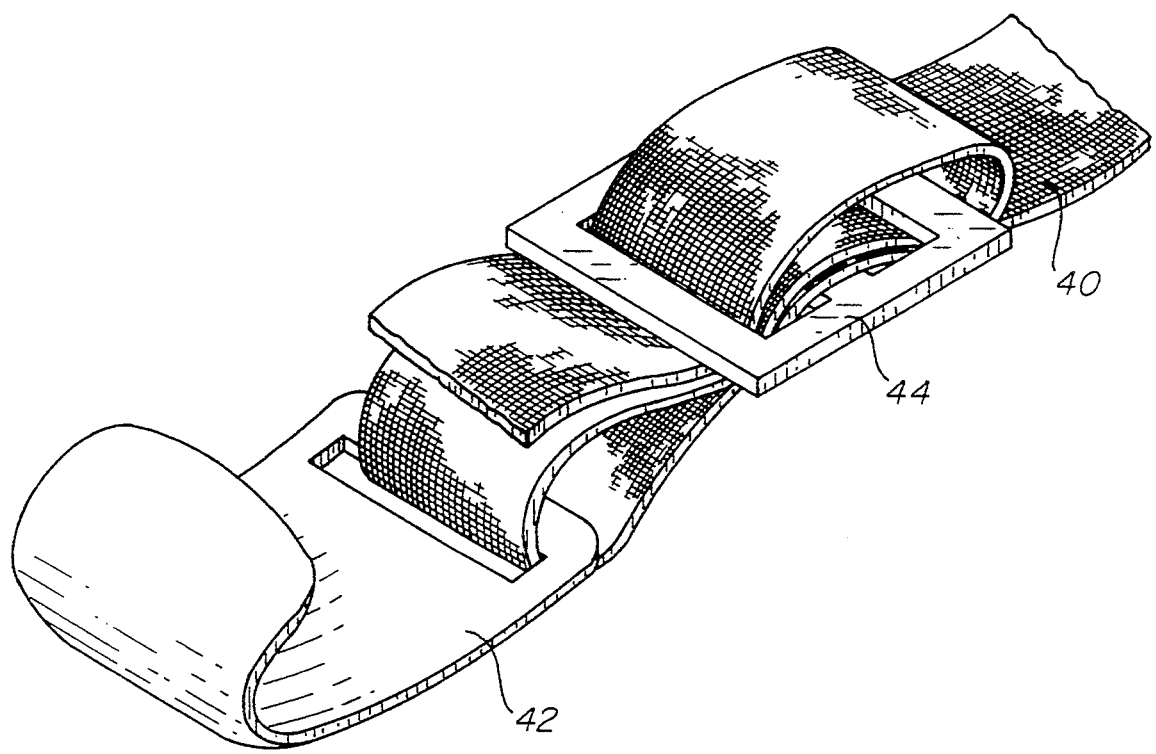
FIG. 3 is an enlarged view of the securement strap of FIG. 3 depicting the securable and securement means.
Figure 4:
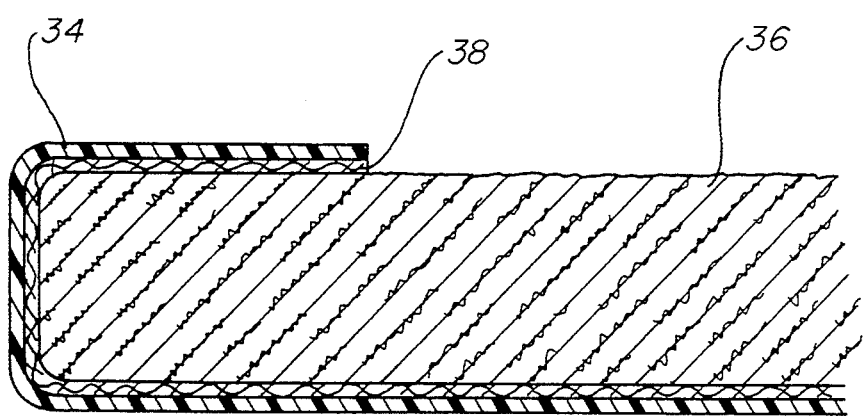
FIG. 4 is a cross sectional view of the present invention taken along the line 4—4 of FIG. 3.
Figure 5:
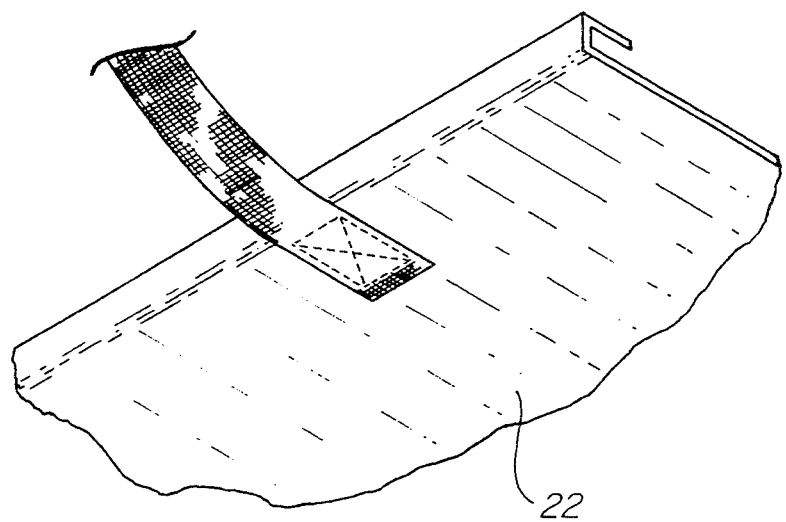
FIG. 5 is an enlarged view of the coupling between the securement strap and exterior surface of the sheet.
Figure 6:
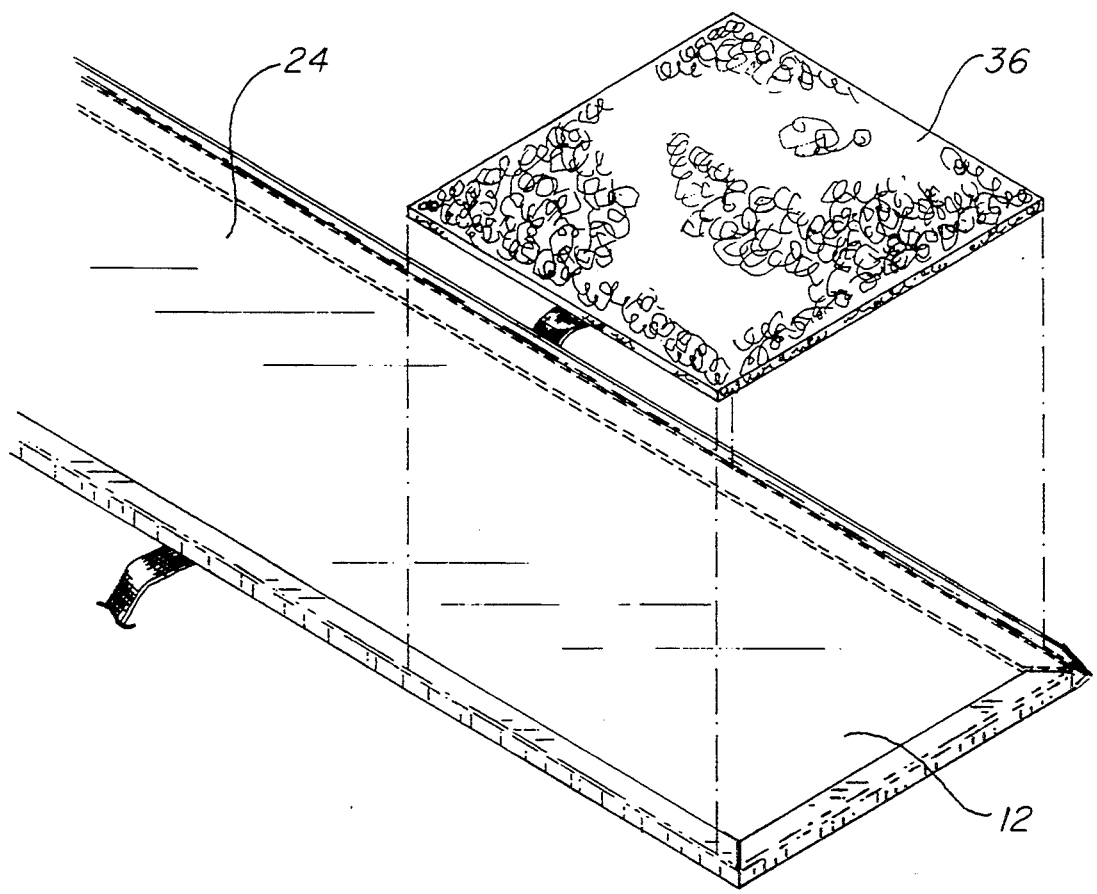
FIG. 6 is an exploded perspective view of an absorbent pad and is relative position on the sheet.

With reference now to the drawings, and in particular, to FIG. 1 thereof, the preferred embodiment of the new and improved vehicle drip guard embodying the principles and concepts of the present invention and generally designated by the reference number 10 will be described.

Specifically, the present invention includes four major components. The major components are the sheet, absorbent pads, absorbent cloth, and securement straps. These components are interrelated to provide the intended function.

More specifically, it will be noted in the various Figures that the first major component is the sheet 12. The sheet is flexible and rectangular in structure. It is adapted to be extended under a vehicle from the front end 14 to the rear end 16 and from one side 18 to the other side 20. The sheet has an exterior surface 22 and an interior surface 24. It also has front and rear edges 26, 28 and opposed side edges 30, 32 with the edges curved upwards towards the interior surface to define a peripheral flap 34.

The second major component is the absorbent pads 36. The pads are disposed upon the interior surface 24 of the sheet. They are adjustably positioned under the peripheral flap 34 for collecting leaking fluids from a vehicle.

The third major component is the absorbent cloth 38. The absorbent cloth is disposed between the pads 36 and the sheet 34. It is adapted for collecting excess fluids that leak through the pads.

The fourth major component is the sets of securement straps. There are three sets of securement straps. These sets are interrelated to provide the intended function.

More specifically, the first set is a pair of front securement straps 40. Each strap has a first end coupled to the exterior surface of the sheet near the front corner thereof, a second end having securable means 42 coupled thereto, and adjustable means 44 coupled therebetween for adjusting the length of the strap. The securable means on both straps are adapted to be secured to and hold the front edge 26 of the sheet under and near the front end 14 of a vehicle.

The second set is a pair of rear securement straps 46. Each strap has a first end coupled to the exterior surface of the sheet near each rear corner thereof, a second end having securable means coupled thereto, and adjustable means coupled therebetween for adjusting the length of the strap. The securable means on both straps are adapted to be secured to and hold the rear edge 28 of the sheet under and near the rear end 16 of a vehicle.

The third set is a pair of side securement straps 48. Each strap has a first end coupled to the exterior surface of the sheet on each side edge 30, 32 thereof, a second end having securable means coupled thereto, and adjustable means coupled therebetween for adjusting the length of the strap. The securable means on both straps are adapted to be secured to and hold the side edges of the sheet under and near the side edges 18, 20 of a vehicle.

The present invention is made of a sheet of fabric that will not allow oil and grease to penetrate or pass through it. The sheet can also be made of plastic. The edges of the sheet are folded over to form a peripheral flap for holding absorbent pads that can be placed where needed. The pads in combination with the sheet form a diaper-like configuration adapted for collecting leaking fluids from vehicles. The six adjustable straps attach the vehicle drip guard to a vehicle and simultaneously hold the guard up and off the garage floor or driveway. With the vehicle drip guard placed in this configuration, the vehicle can be moved short distances. The straps are adjustable for avoiding hot surfaces and movable parts under a vehicle such as exhaust pipes, mufflers, and drive shafts. The vehicle drip guard prevents fluid leakage from a vehicle from permanently staining a driveway or garage floor.

The vehicle drip guard is utilized by first unrolling the sheet and placing it beside the vehicle from the front end to the rear end thereof. The absorbent pads are now laid upon the sheet at points of oil, coolant, transmission fluid, power steering fluid, or brake fluid leakage. The pads are tucked under the peripheral flap, thus securing the pads in place. Now the guard is laid in front of the vehicle on the driveway or garage floor, and the vehicle is moved forward to straddle it. The front and rear straps are now hooked to the bumpers of the vehicle and adjusted so that the guard hangs therefrom above the driveway or garage floor. The side straps are then attached to the running boards or door kick panels of the vehicle and then adjusted. Once the vehicle drip guard has been adjusted to fit on and under a given vehicle, it can be easily removed and reinstalled in a few seconds. The present invention is designed to fit modern day vehicles as well as vintage vehicles like the model A Ford.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A vehicle drip guard for collecting fluids that leak from a vehicle comprising, in combination:

a flexible and rectangular sheet of material adapted to be extended under the vehicle from the front end to the rear end and from one side to the other side, the sheet having an exterior surface, an interior surface, opposed front and rear edges, and opposed side edges with the edges curved upwards towards the interior surface to define a peripheral flap;

a plurality of separate absorbent pads disposed upon the interior surface of the sheet and adjustably positioned under the peripheral flap for collecting leaking fluids from the vehicle;

an absorbent cloth disposed between the pads and sheet for collecting excess fluids that leak through the pads;

a pair of inextensible front securement straps, each strap having a first end coupled to the exterior surface of the sheet near each front corner thereof, a second end having securable means coupled thereto, and adjustable means coupled therebetween for adjusting the length of the strap such that the securable means on both straps are adapted to be secured to and hold the front edge of the sheet under and near the front end of the vehicle;

a pair of inextensible rear securement straps, each strap having a first end coupled to the exterior surface of the sheet near each rear corner thereof, a second end having securable means coupled thereto, and adjustable means coupled therebetween for adjusting the length of the strap such that the securable means on both straps are adapted to be secured to and hold the rear edge of the sheet under and near the rear end of the vehicle; and a pair of inextensible side securement straps, each strap having a first end coupled to the exterior surface of the sheet on each side edge thereof, a second end having securable means coupled thereto, and adjustable means coupled therebetween for adjusting the length of the strap such that the securable means on both straps are adapted to be secured to and hold the side edges of the sheet under and near the side edges of the vehicle.

* * * * *